US008051656B1

(12) United States Patent
Cripe et al.

(10) Patent No.: US 8,051,656 B1
(45) Date of Patent: Nov. 8, 2011

(54) SHAPE-MEMORY ALLOY ACTUATOR

(75) Inventors: David Wayne Cripe, Mount Vernon, IA (US); Bryan S. McCoy, Cedar Rapids, IA (US); Ryan J. Legge, Cedar Rapids, IA (US); Gerard A. Woychik, Shellsburg, IA (US); Robert P. Campbell, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 902 days.

(21) Appl. No.: 11/963,738

(22) Filed: Dec. 21, 2007

(51) Int. Cl.
*F01B 29/10* (2006.01)
(52) U.S. Cl. ............... 60/528; 60/529; 310/307
(58) Field of Classification Search ............ 60/527–529; 310/306–309
See application file for complete search history.

(56) References Cited

U.S. PATENT DOCUMENTS

| 1,741,601 | A | 12/1929 | Appelberg |
|---|---|---|---|
| 2,317,523 | A | 4/1943 | Delano |
| 3,210,643 | A | 10/1965 | Else et al. |
| 3,634,803 | A | 1/1972 | Willson et al. |
| 3,725,835 | A | 4/1973 | Hopkins et al. |
| 3,968,380 | A | 7/1976 | Jost et al. |
| 4,007,404 | A | 2/1977 | Jost et al. |
| 4,423,401 | A | 12/1983 | Mueller |
| 4,544,988 | A | 10/1985 | Hochstein |
| 4,551,975 | A | 11/1985 | Yamamoto et al. |
| 4,700,541 | A | 10/1987 | Gabriel et al. |
| 4,734,047 | A | 3/1988 | Krumme |
| 4,887,430 | A | 12/1989 | Kroll et al. |
| 5,410,290 | A | 4/1995 | Cho |
| 6,016,096 | A | 1/2000 | Barnes et al. |
| 6,049,267 | A | 4/2000 | Barnes et al. |
| 6,078,243 | A | 6/2000 | Barnes et al. |
| 6,133,816 | A | 10/2000 | Barnes et al. |
| 6,239,686 | B1 | 5/2001 | Eder et al. |
| 6,247,678 | B1* | 6/2001 | Hines et al. ............... 251/11 |
| 6,494,225 | B1* | 12/2002 | Olewicz et al. ............ 137/1 |
| 6,516,146 | B1 | 2/2003 | Kosaka |
| 6,981,374 | B2 | 1/2006 | von Behrens et al. |
| 7,036,312 | B2 | 5/2006 | Menard et al. |
| 7,256,518 | B2 | 8/2007 | Gummin et al. |
| 7,372,355 | B2 | 5/2008 | Agronin et al. |
| 2001/0010488 | A1 | 8/2001 | Minners |
| 2005/0001367 | A1* | 1/2005 | Taya et al. ............... 267/166 |
| 2005/0115235 | A1 | 6/2005 | Mernoe |
| 2005/0184533 | A1* | 8/2005 | Hebenstreit et al. ......... 292/201 |
| 2008/0125941 | A1* | 5/2008 | Mitteer ...................... 701/46 |

FOREIGN PATENT DOCUMENTS

| JP | 1-262373 A | 10/1989 |
|---|---|---|
| WO | WO 03/095798 A1 | 11/2003 |
| WO | PCT/2008/073330 | 8/2008 |

OTHER PUBLICATIONS

U.S. Appl. No. 11/963,741, filed Dec. 21, 2007, Cripe et al.
U.S. Appl. No. 11/903,666, filed Sep. 24, 2007, Woychik et al.
U.S. Appl. No. 11/787,573, filed Apr. 17, 2007, Woychik et al.

(Continued)

*Primary Examiner* — Hoang Nguyen
(74) *Attorney, Agent, or Firm* — Daniel M. Barbieri

(57) ABSTRACT

A shape memory element (a structure formed from a shape memory alloy) includes an electrically conductive ferromagnetic material. The ferromagnetic material may be magnetostrictive. In some embodiments, the shape memory element is formed from a shape memory alloy core and has a cladding over the core that includes the ferromagnetic material. In other embodiments, the shape memory alloy may be selected to be ferromagnetic.

23 Claims, 7 Drawing Sheets

OTHER PUBLICATIONS

U.S. Appl. No. 11/499,104, filed Aug. 4, 2006, Woychik et al.
Loh et al., "Natural Heat-Sinking Control Method for High-Speed Actuation of the SMA," *International Journal of Advanced Robotic Systems*, 2006, pp. 303-312, vol. 3, No. 4.
International Search Report and Written Opinion for Application No. PCT/US2008/073330, dated Mar. 6, 2009, 8 pages.
Office Action for U.S. Appl. No. 11/499,104, mail date Oct. 8, 2009, 10 pages.
Office Action for U.S. Appl. No. 11/903,666, mail date Jan. 26, 2010, 11 pages.
Office Action for U.S. Appl. No. 11/499,104, mail date Mar. 25, 2010, 10 pages.
Office Action for U.S. Appl. No. 11/499,104, mail date Aug. 4, 2010, 10 pages.
Office Action for U.S. Appl. No. 11/903,666, mail date Sep. 10, 2010, 14 pages.
Office Action for U.S. Appl. No. 11/963,741, mail date Oct. 26, 2010, 6 pages.

* cited by examiner

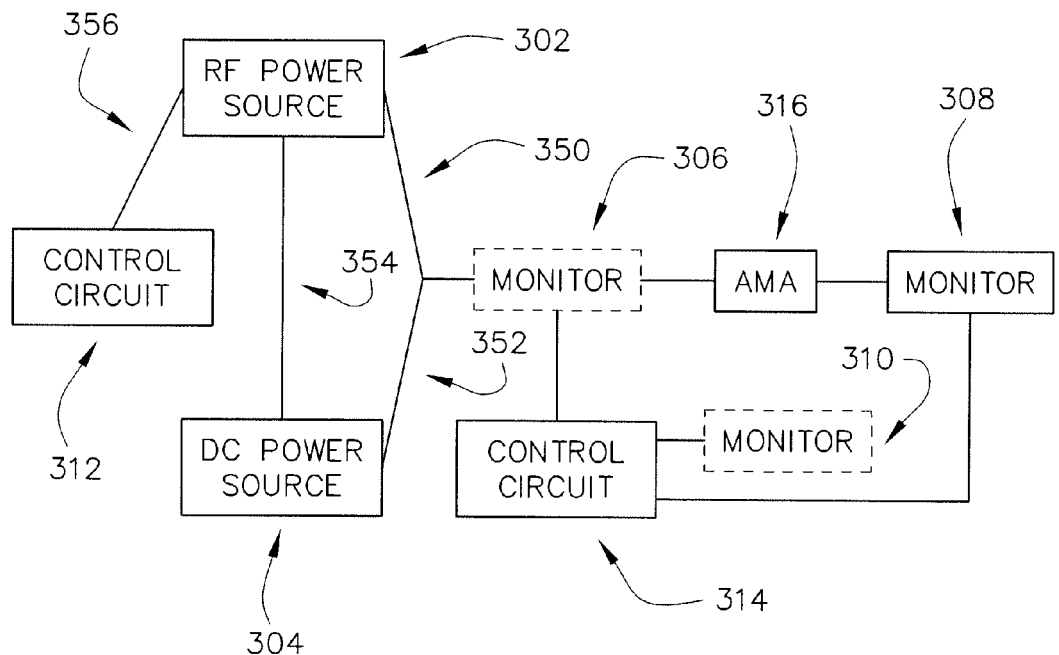
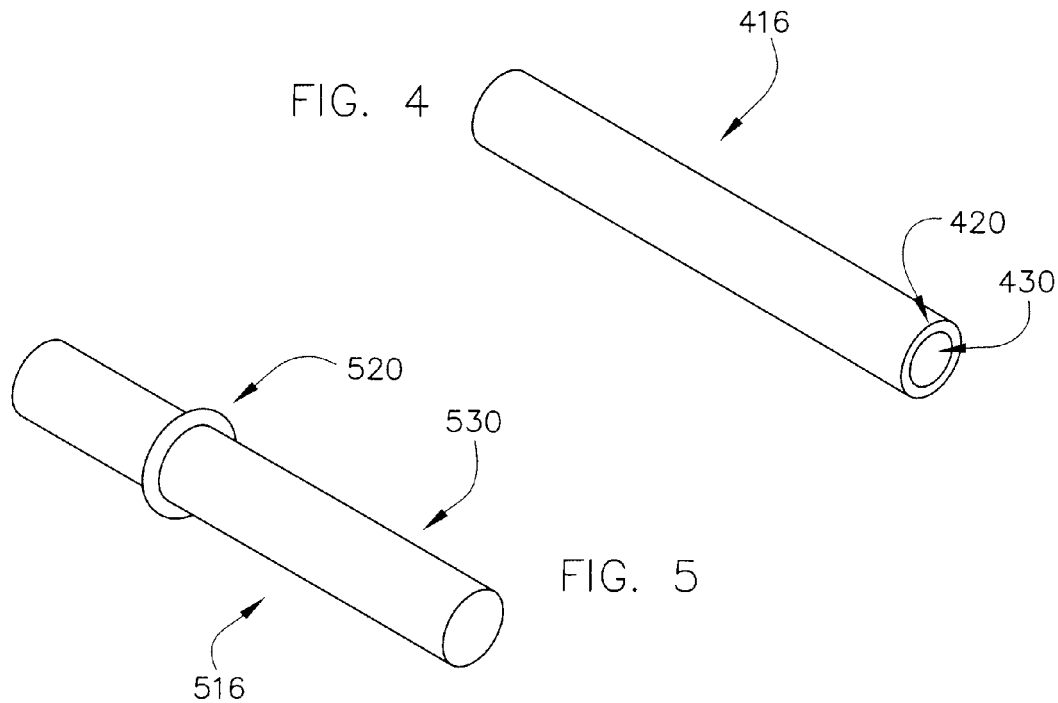

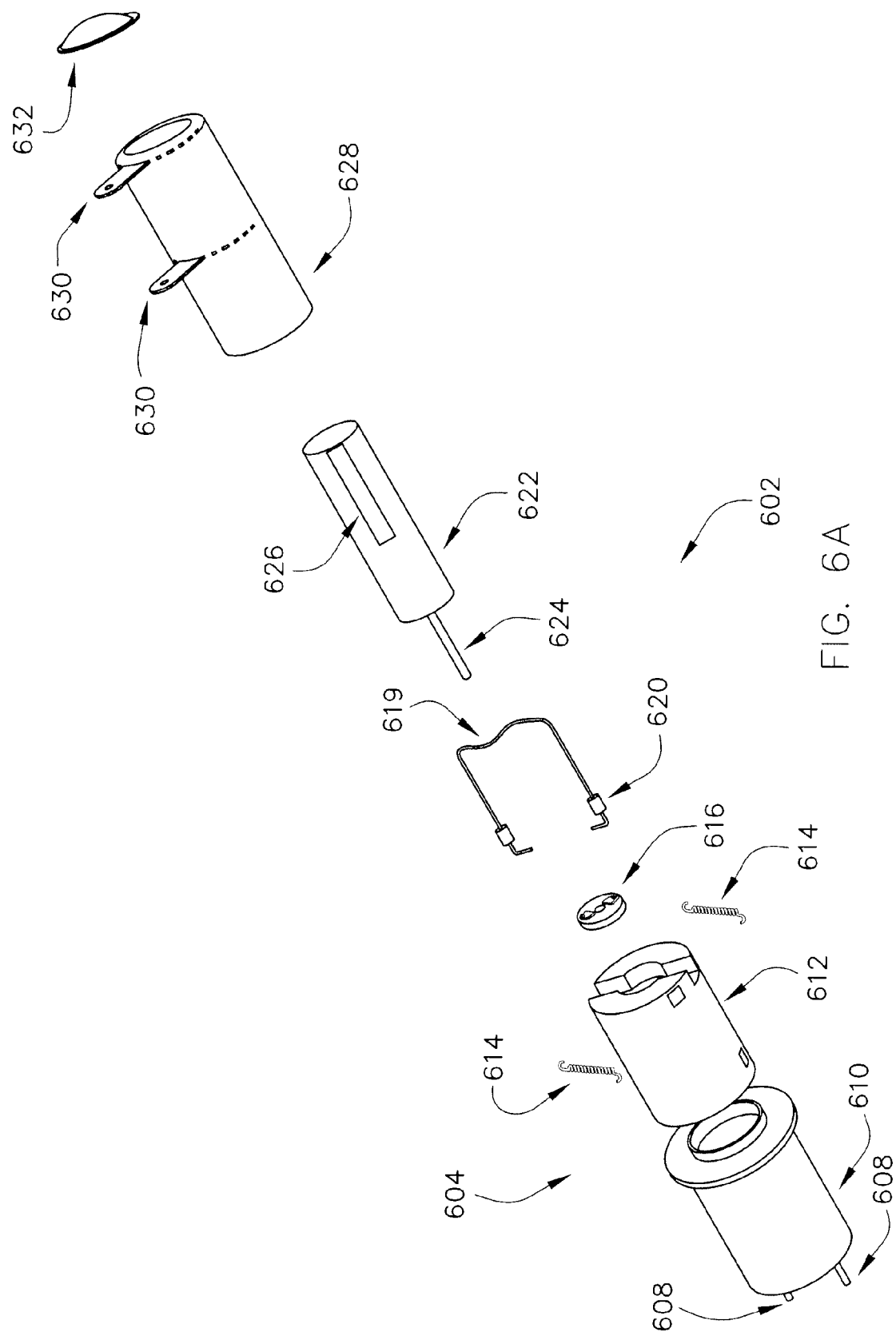

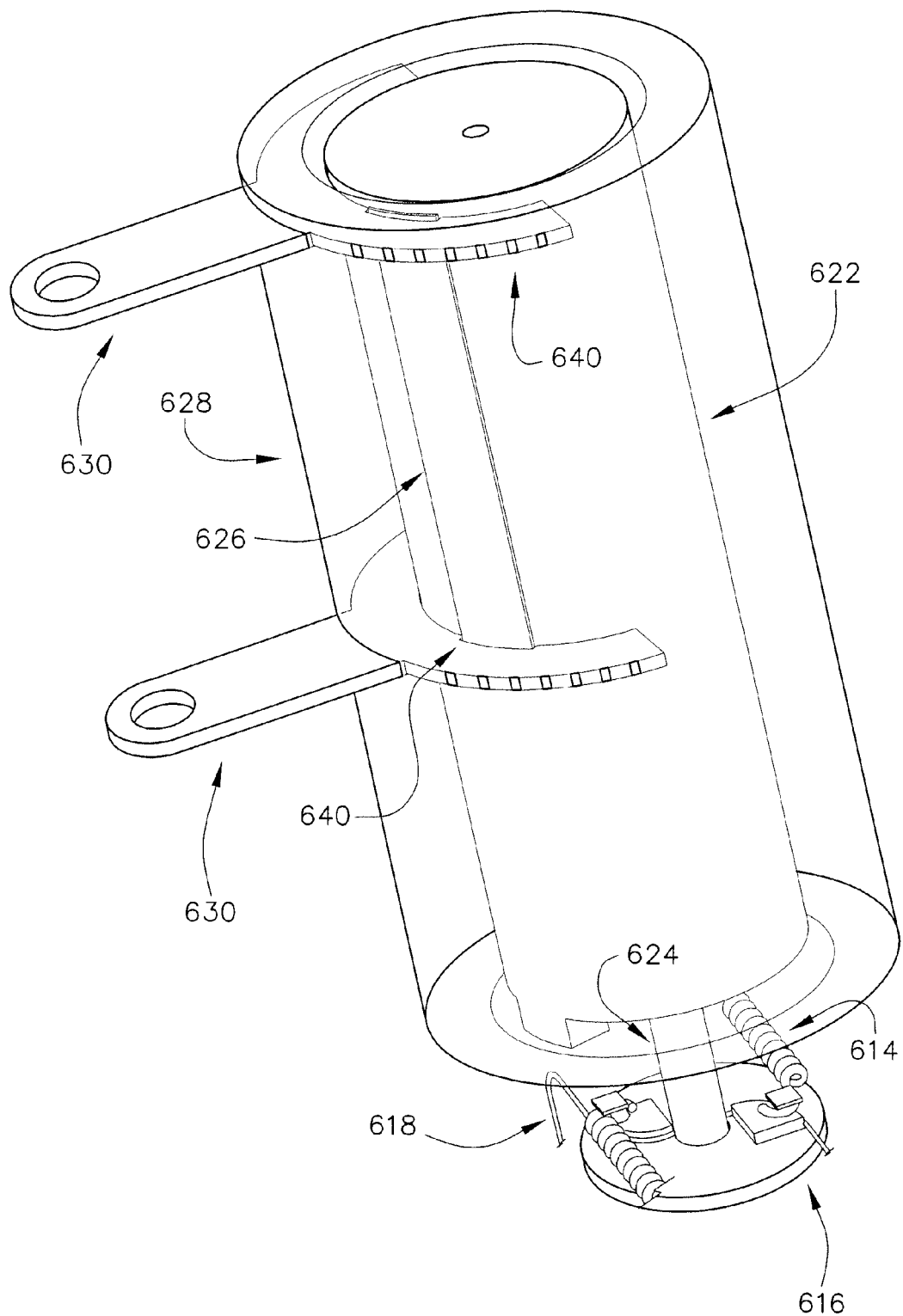

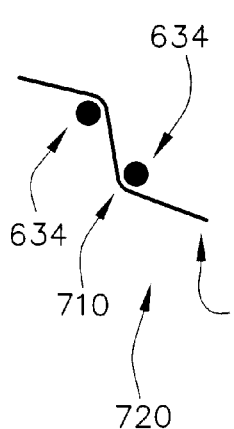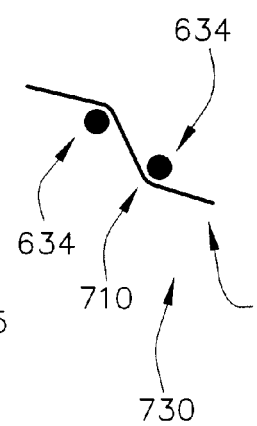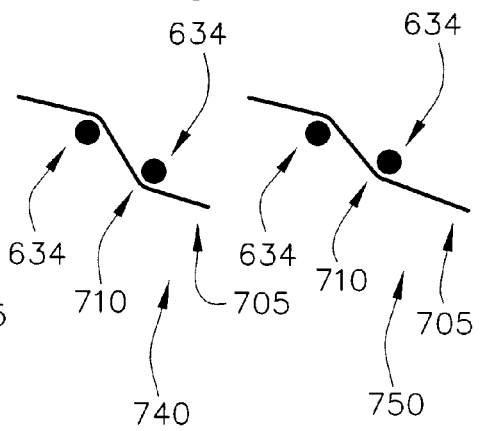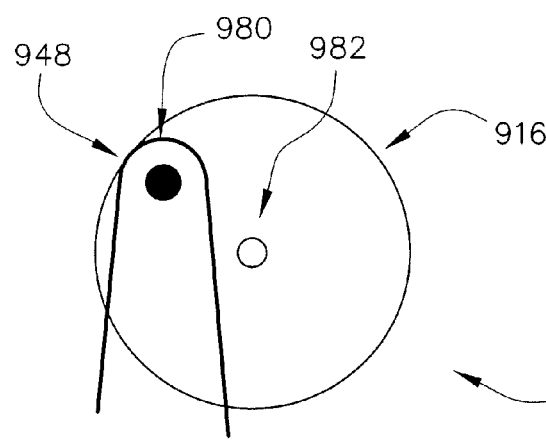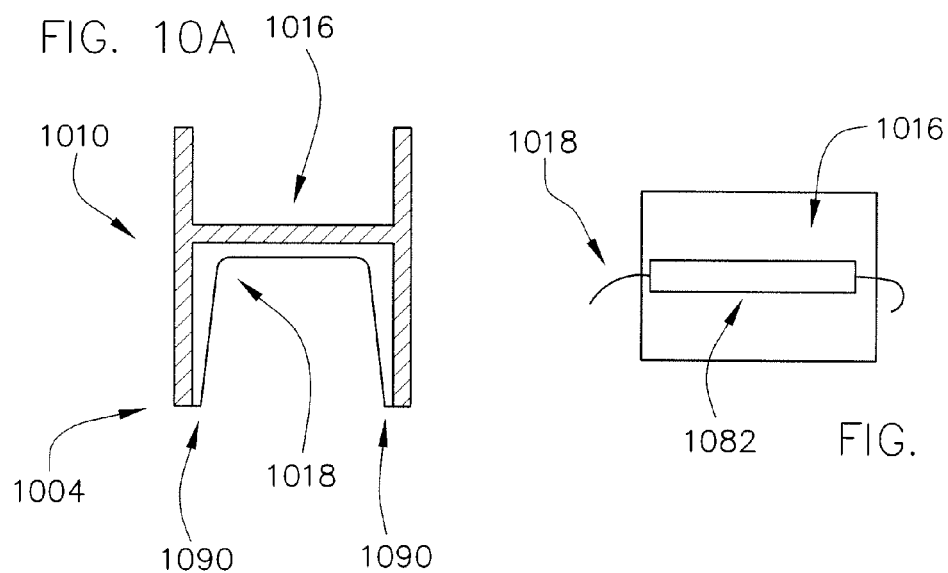

SHAPE-MEMORY ALLOY ACTUATOR

BACKGROUND

An actuator can be formed using a material that changes shape in response to application of an external force and that returns to a predictable shape after the force is removed. One example is a shape memory alloy (SMA). SMAs typically change shape in response to the application of heat and return to the same or substantially the same shape after the heat source is removed. In many instances, an SMA will change shape in response to a current passing through the SMA (e.g. where the current passing through the SMA heats the SMA).

Previous actuators formed from SMAs have been powered by applying a DC current through the SMA element. These actuators have experienced multiple difficulties which have prevented them from being used in practice. In particular, SMAs have been difficult to actuate within a reasonable amount of time for many applications, generally taking longer than 500 ms to sufficiently heat the SMA to the point at which it actuates. To obtain faster actuation, high currents have been passed through the SMA element. While this allows for actuation speeds up to around 5 ms, the life cycle of these actuators is greatly reduced (e.g. they can be used for far less than 100 thousand cycles while maintaining adequate performance). It was generally believed that an SMA based actuator could not be created which was both responsive and had a sufficient life.

BRIEF DESCRIPTION OF THE DRAWINGS

FIG. 3 is a block diagram of an SMA actuator according to one embodiment;

FIG. 4 is a cladded SMA element according to one embodiment;

FIG. 5 is a cladded SMA element according to one embodiment;

FIGS. 6A-C are illustrations of a switch including an SMA actuator according to one embodiment;

FIGS. 7A-D are illustrations of SMA actuator positions according to one embodiment;

FIG. 9 is an illustration of a switch including an SMA actuator according to one embodiment; and FIGS. 10A-B are illustrations of a switch including an SMA actuator according to one embodiment.

DETAILED DESCRIPTION OF EXEMPLARY EMBODIMENTS

The present application overcomes many of the problems of the prior techniques applied to SMA actuators, and disproves the generally held belief that an SMA based actuator could not be created which is both responsive and has a sufficient life.

One technique used in many embodiments is to apply a base current during non-actuation periods to maintain the SMA element of the SMA actuator in a pre-actuated state. The pre-activated state of the SMA actuator may be its rest position, or may be an intermediate position that is between the rest position and the actuated position. When actuation is desired, additional current (or an alternate current) is supplied in order to bring the SMA element to its actuated state.

Another technique developed was to monitor criteria related to the SMA element in order to better control the SMA element. For example, a criteria related to the shape of the SMA element may be monitored in order to control the base current being applied, may be monitored to control the actuation current being applied, etc.

While any number of criteria can be monitored, it was discovered that at least some SMA elements have a noticeable change in impedance as the SMA element changes shape. It was even further discovered that this effect becomes even more noticeable when the SMA element is at least partially ferromagnetic (e.g. has a ferromagnetic outer surface—particularly one that is magnetostrictive and/or magnetoelastic—over all or part(s) of the SMA element, is an FSMA, has a ferromagnetic portion other than along the outer surface, etc.). In some embodiments, this impedance to an AC current can be used actively and/or passively in order as one means of controlling the base current (e.g. a DC current) applied to the SMA element.

Another technique used is to apply an AC current (e.g. an AC current provided at an RF frequency) to actuate the SMA element. This AC current may be used with the base current technique described above (i.e. the AC current may be applied on top of the base current when actuation is desired) or may be used independently.

Using one or more of these techniques, it has been found that an SMA actuator may be reliably actuated in under 50 ms (even under 10 ms) without substantially degrading the performance of the actuator (e.g. may provide actuation in under 50 ms for over a million cycles), contrary to the prevailing assessment in the art.

Figure 1:
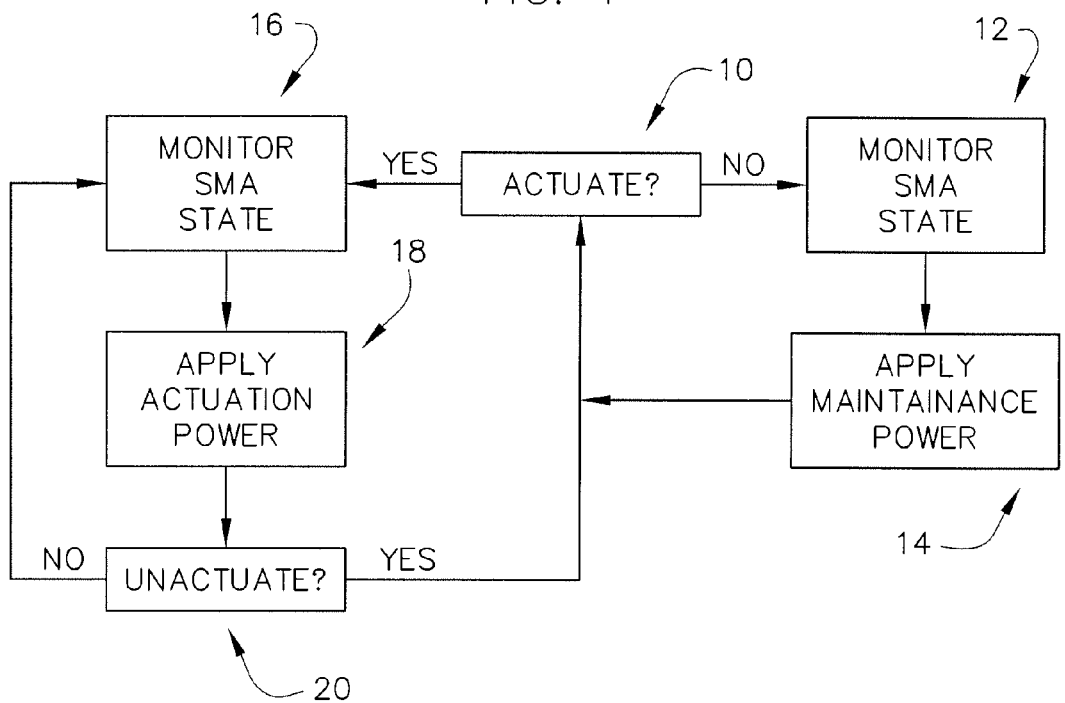
FIG. 1 is a flow diagram of a method for controlling an SMA actuator according to one embodiment.
Figure 2:
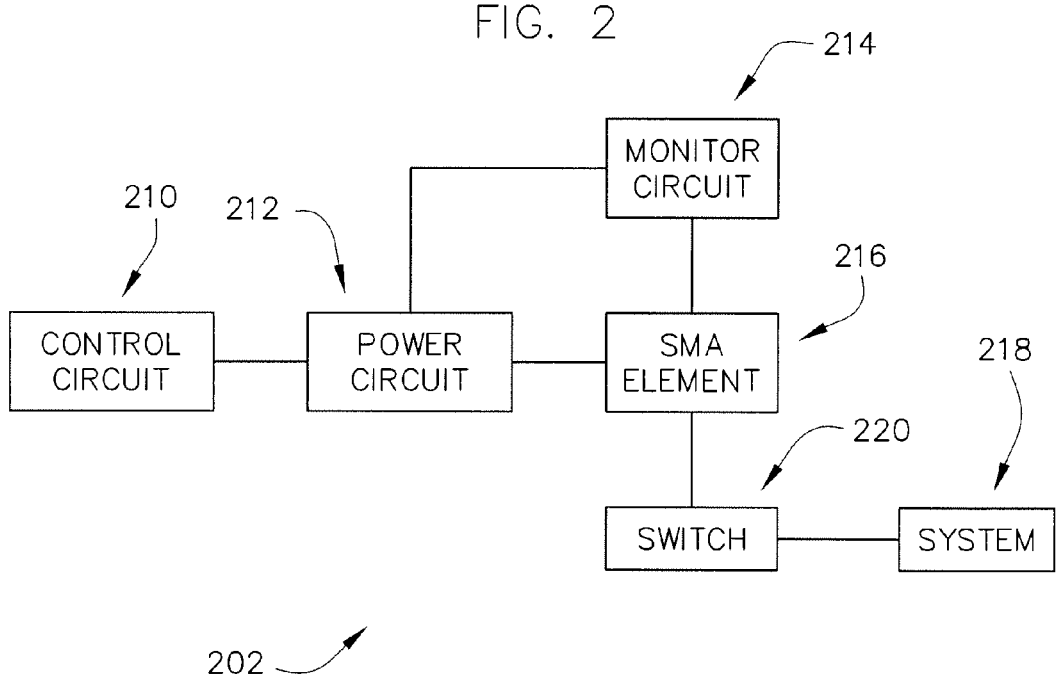
FIG. 2 is a block diagram of a system including an SMA actuator according to one embodiment.

Referring to FIGS. 1 and 2, a method for actuating a shape memory alloy (SMA) actuator 202 comprises determining whether to actuate the actuator at block 10. The determination at block 10 may be based on an input from a switch, a control circuit 210 (e.g. a processing circuit), etc. If the actuator is not being actuated, the method may continue to monitor whether to actuate the actuator at block 10, or may monitor a state of the SMA at block 12 in order to control the SMA actuator at block 14.

Controlling the SMA actuator 202 may involve applying power from a power circuit 212 at block 14 in order to maintain the SMA element 216 in a pre-actuated state. The pre-actuated state is a state that is between the rest state of the SMA element 216 (e.g. the default state of the SMA element) and the actuated state of the SMA element 216 (the state of the SMA element 216 at which the actuator 202 is actuated). The pre-actuated state may be a rest shape state (see, e.g. state 720 of FIG. 7A) in which the SMA element 216 is essentially the same shape as the SMA element 216 in its rest state, or may be a transition shape state (see, e.g. state 730 of FIG. 7B) in which the SMA element 216 is a different shape than the shape of the SMA element 216 in the rest state but is also a different shape than the actuated state shape (see, e.g. state 740 of FIG. 7C).

Applying power from a power circuit 212 at block 14, may include applying a base current configured to maintain the SMA element 216 at a pre-actuated state. A base current applied at block 14 may be directly applied to the SMA element 216 (e.g. a current running through the SMA element 216) and/or may be applied to an element (not illustrated) such as a heating element (e.g. a resistor, heating coil, etc.) in proximity to the SMA element 216.

A base power from power circuit 212 may be a direct current signal, an alternating current signal, and/or some other type of signal. The base power may be applied continuously or may be applied discontinuously (e.g. in bursts such as pulses). The base power may be applied at a fraction of the actuation power (the minimum continuous current required to first actuate the SMA and maintain it in an actuated state) such that less power needs to be applied to actuate the actuator.

For example, in some embodiments, the base power may be at least 10%, at least 20%, at least 30%, at least 40%, at least 50%, at least 60%, at least 70%, at least 80%, and/or at least 90% of the actuation power (i.e. is the amount of power that effectively reduces an amount of actuation power required to actuate the actuator by the listed percentage). In some embodiments, the base power may be up to 90%, up to 80%, up to 70%, up to 60%, up to 50%, up to 40%, up to 30%, and/or up to 20% of the actuation power. In other embodiments, the base power may be less than 10% or more than 90% of the actuation power.

In one exemplary embodiment, the base power is about 80% of the actuation power and includes at least a direct current signal portion. In another exemplary embodiment, the base power is about 30% of the actuation power and includes a direct current signal portion.

The type and/or amount of power applied at block 14 may be based on a criteria related to the state of the SMA actuator 202 that is monitored at block 12. The criteria monitored may be directly related to the state of the SMA element 216 and/or may indirectly provide information suggestive of the state of the SMA element 216. For example, an increase in impedance and/or resistance of the SMA element 216 to a signal passed through the SMA element 216 may be directly related to a change in shape of the SMA element 216. As another example, a change in the ambient temperature around (or direct temperature of) the SMA element 216 may indirectly suggest that the SMA element 216 will change shape if the measured temperature is around the temperature at which the SMA element 216 changes shape.

In one embodiment, an RF signal is applied along the SMA element 216 such that at least a portion of the RF signal passes through the SMA element 216. The impedance to the RF signal is monitored at block 12 by a monitoring circuit 214, and is used to control application of a base power from power circuit 212 at block 14. In another embodiment, a DC signal is applied along the SMA element 216 such that at least a portion of the DC current passes through the SMA element 216. The resistance to the DC signal is monitored at block 12 by a monitoring circuit 214, and is used to control application of a base power from power circuit 212 at block 14. In another embodiment, a monitoring circuit 214 is used to monitor the temperature of (e.g. in the vicinity of) the SMA element 216 at block 12, and is used to control application of a base power from a power circuit 212 at block 14. Each of these monitoring embodiments may be used in the alternate, or in any combination.

Steps 10-14 may be continually repeated such that the SMA element 216 is dynamically maintained at a pre-actuated state. In some embodiments, step 12 may be omitted such that a constant base power is applied at block 14.

If the actuator is being actuated at block 10, an actuation power is applied from a power circuit 212 at block 18 (e.g. using the same or different portions of a power circuit used to apply power at block 14) in order to actuate the SMA actuator 202. The actuation power applied at block 18 may have any of the characteristics of the power discussed above with respect to block 14 (e.g. DC, AC, RF, continuous, discontinuous, etc.). In one exemplary embodiment, the power applied at block 18 includes a modulated portion. The modulated portion may be modulated at a radio frequency (RF). In some of these embodiments, the actuation power provided at block 18 consists essentially of a modulated (e.g. an RF) signal.

In some embodiments, the actuation power applied from the power circuit 212 at block 18 may include the full power needed to actuate the SMA actuator 202. In other embodiments, the actuation power applied at block 18 is applied on top of the base power applied at block 14 (i.e. the actuation power and base power are both applied such that the combination of powers combines to provide enough power to actuate the actuator 202). In some of these embodiments, the actuation power, if applied alone, would not be enough power to actuate the actuator 202.

The actuation power applied at block 18 may be the same as or different than the base power applied at block 14. In some embodiments, the base power consists primarily (e.g. at least 51%), mostly (e.g. at least 70%), and/or essentially (e.g. at least 85%) of a direct current signal, while the actuation power consists primarily, mostly, and/or essentially of an alternating current signal (e.g. an RF signal).

In some embodiments, the signal applied at block 18 (e.g the amount, type, etc. of signal) may be based on the monitored state of the SMA actuator 202 determined at block 16. The monitoring at block 16 may be any of the types (or combinations of types) of monitoring discussed above with respect to block 12 and may use common or different monitoring circuits 214 as those used in block 12.

A determination is then made at block 20 by a control circuit 210 regarding whether the actuation should be maintained. If actuation is not to be maintained, then the method returns to step 10. If actuation is to be maintained, then the method returns to either block 16 or 18.

In some embodiments, the power applied at block 18 may be a determined amount of power needed to maintain the SMA actuator 202 in its actuated state. The determined amount of power may be predetermined (e.g. a fixed amount, an amount based on a criteria unrelated to the SMA element 216, etc.), or may be based on a monitored criteria at block 16. In other embodiments, the amount of power applied at block 18 to maintain the SMA actuator 202 in its actuated state may be based on a natural feedback mechanism. For example, an SMA element 216 may be designed to have a high impedance at a point just beyond its initial actuated state such that the amount of an RF actuation power passing through the SMA element is reduced significantly at that point. This may be achieved, for example, by using an SMA element 216 of ferromagnetic composition (e.g. that includes a ferromagnetic cladding). In some embodiments, the power is based on a combination of a determined amount of power and a natural feedback mechanism.

In some embodiments where the determined amount of power is based on a monitored criteria, the amount of power applied at block 18 to maintain the actuator 202 in its actuated state may be based on the minimum amount of power necessary to maintain the actuator 202 in its actuated state. In these embodiments, the amount of power applied from power circuit 212 at block 18 to maintain the actuator in its actuated state may be close to (e.g. within two times) the minimum amount of power, may be essentially (e.g. within one and a half times) the minimum amount of power, or may be about the minimum (e.g. within 10% of the minimum) amount of power needed to maintain the SMA element in its actuated state.

Steps 10-20 may be controlled by a control circuit 210 such as a feedback circuit. Control circuit 210 may be implemented as any type of circuit such as an analog control circuit and/or a digital control circuit (e.g. a processing circuit). The functions of control circuit 210 may be implemented in a single control circuit 210 or may be implemented by a number of discrete circuits which are (when taken as a whole) control circuit 210. For example, controlling of actuation at blocks 10 and 20 may be based on a signal from a processor (e.g. a controller or microprocessor) while control of an amount of power at blocks 14 and 18 may be based on a separate (e.g. analog, digital, etc.) feedback circuit. However, reference to a control circuit configured to perform a function in a claim would include both single circuits and two or more separate circuits unless specifically referred to as a single control circuit in that claim.

As shown in FIG. 3, an exemplary control circuit 210 (FIG. 2) includes a first control circuit portion 312 configured to control a modulated power source 302 over line 356 to provide an actuation power to the SMA element 316 to actuate the SMA actuator 202 (FIG. 2). Control circuit portion 312 may include any control (and other) circuits including a switch, a processor (e.g. a microcontroller or microprocessor), analog signal processing circuitry, etc. The control circuit 210 (FIG. 2) also includes a second control circuit portion 314 configured to control a DC power source 304 to provide a maintenance power to SMA element 316 to maintain SMA element 316 in a pre-actuated state. Control circuit portion 314 may be configured to control power source 304 based on signals received from one or more monitoring circuits 306-310. Control circuit portion 314 could include any control (and other) circuits including rectifier(s), amplifier(s), comparator(s), filter(s), digital signal processing and control circuitry, etc.

In some embodiments, control circuit portion 312 could additionally (or alternatively) control power source 304 and/or control circuit portion 314 could additionally (or alternatively) control power source 302. Also, in some embodiments, control circuit portion 312 and control circuit portion 314 may share common components such that they form a unitary control circuit 210 (FIG. 2).

Referring back to FIGS. 1 and 2, a power circuit 212 may be configured to supply the power (e.g. a portion of the power, all of the power, etc.) applied at one or both of blocks 14 and 18. Power circuit 212 may be a single power circuit, or may include multiple power circuits which themselves may or may not be supplied from a common power source. For example, as illustrated in FIG. 3, power circuit 212 may include a modulated power source 302 (e.g. an RF power source) configured to provide a modulated (e.g. RF) signal to SMA element 316 along line 350 and a DC power source 304 configured to provide a DC signal to SMA element 316 along line 352. Power source 304 may be configured to provide a steady signal or may provide a pulsed or otherwise modulated signal, and power source 302 may provide an alternating current signal. Power source 304 may also be configured to supply power to power source 302 along line 354, which power may be the same as (e.g. voltage, form, etc.) or different than the power provided along line 352.

DC power source 304 may include any circuits, such as a conductor line, power processing circuits (e.g. a diode to protect from reverse voltages, switches, filters, etc.), etc. The modulated power source 302 may include any circuits configured to provide modulated power such as an oscillator (e.g. a Colpitts oscillator, a Hartley oscillator, etc.), and/or other circuits (e.g. an amplifier, a variable resistor, a transistor, optocoupler, solid state relay, etc.).

Referring to FIGS. 1 and 2, monitoring at blocks 12 and/or 16 may involve receiving data from a monitoring circuit 214. Monitoring circuit 214 may include a single monitoring circuit 306-310 (FIG. 3) or may include more than one monitoring circuit 306-310 (FIG. 3). Monitoring circuit 214 could measure a parameter related to a signal passing through SMA element 216. For example, as shown in FIG. 3, monitor 306, 308 may be connected in series (or parallel) to SMA element 316 and may be configured to measure a parameter related to the signal passing through SMA element 316 (e.g. before or after the signal has passed through SMA element 316). For example, monitoring circuit 306 and/or 308 may be configured to measure impedance to an RF signal passing through the circuit including SMA element 316 (e.g. by being in series to or in parallel to SMA element 316). The monitoring circuit may include a diode and/or an operational amplifier configured to provide a signal based on the impedance of the circuit comprising the SMA element.

Monitoring circuit 214 could be configured to measure a parameter unrelated to a signal passing through SMA element 216. In particular, referring to FIG. 3, monitoring circuit 214 could include a monitoring circuit 310 configured to measure a parameter related to the SMA element, but not of the SMA element. For example, circuit 310 could include a temperature sensor (e.g. a thermistor, a microprocessor whose clock cycle or other parameter changes with temperature, etc.) configured to measure a change in the temperature around the SMA element 316, a photo sensor configured to identify changes in a shape of the SMA element, a sensor configured to identify movements in the device actuated by the SMA actuator 202 (FIG. 2) (e.g. of a switch 220 and/or a relay 218 of FIG. 2) (e.g. to monitor movement from a rest position to a non-rest position), etc.

According to most embodiments, the SMA actuator 202 may be capable of actuating within one second of applying the actuation power at block 18. According to some embodiments, the SMA actuator 202 may be capable of actuating within about 500 ms, within about 300 ms, within about 100 ms, within about 75 ms, within about 50 ms, within about 40 ms, within about 30 ms, within about 20 ms, within about 15 ms, within about 10 ms, within about 8 ms, within about 7 ms, within about 6 ms, and/or within about 5 ms. According to some embodiments, an SMA actuator 202 may actuate within one or more of the time limits listed for at least about 100 thousand cycles, at least about 500 thousand cycles, at least about 1 million cycles, at least about 2 million cycles, at least about 3 million cycles, at least about 4 million cycles, and/or at least about 5 million cycles. In other embodiments, the SMA actuator may actuate in more than 500 ms and/or may actuate within a time limit for fewer than 100 thousand cycles.

Composition of SMA Element

Referring to FIGS. 2 and 3, SMA element 216, 316 could be any number of different shape memory alloys. For example, the SMA element may be an alloy that has a memory effect in response to heating. As another example, the SMA element 216,316 may be a ferromagnetic shape memory alloy (FSMA) that is configured to exhibit a shape memory effect in response to the application of a magnetic field (e.g. from an externally generated magnetic field, an internally generated magnetic field generated through the application of an electric current through the SMA element, etc.). The SMA element 216,316 could have a one-way shape memory (e.g. "remembers" one shape), a two-way shape memory (e.g. "remembers" two shapes), and/or some other form of shape memory.

The SMA element 216,316 can have any shape. For example, the SMA element 216,316 may be rounded (e.g. cylindrical, conical, etc.), may be polygonal (e.g. a rectangular box, a hexagonal box, etc.), may be irregularly shaped, may be symmetrical, may be asymmetrical, etc. According to some embodiments, SMA element 216,316 may be a wire-type shape (see, e.g. FIGS. 4 and 5).

The conductive portion of SMA element 216,316 may be any size. According to some embodiments, the conductive portion of the SMA element 216,316 has an average thickness (e.g. diameter, cross-sectional length, etc.) of at least about 0.1 mils, at least about 0.25 mils, at least about 0.5 mils, at least about 1 mil, at least about 2 mils, at least about 3 mils, at least about 4 mils, at least about 5 mils, at least about 6 mils, at least about 8 mils, at least about 11 mils, and/or at least about 13 mils. According to some embodiments, the conductive portion of the SMA element 216,316 has an average thickness of up to about 22 mils, up to about 17 mils, up to about 12 mils, up to about 10 mils, up to about 9 mils, up to about 8 mils, up to about 7 mils, up to about 5 mils, and/or up to about 3 mils. In other embodiments, the conductive portion of the SMA element may have an average thickness of less than 0.1 mils or more than 22 mils.

The shape memory alloy portion of SMA element 216,316 may be any size. According to some embodiments, the shape memory alloy portion of the SMA element 216,316 has an average thickness (e.g. diameter, cross-sectional length, etc.) of at least about 0.1 mils, at least about 0.25 mils, at least about 0.5 mils, at least about 1 mil, at least about 2 mils, at least about 3 mils, at least about 4 mils, at least about 5 mils, at least about 6 mils, at least about 8 mils, at least about 10 mils, and/or at least about 12 mils. According to some embodiments, the shape memory alloy portion of the SMA element 216,316 has an average thickness of up to about 20 mils, up to about 15 mils, up to about 10 mils, up to about 8 mils, up to about 7 mils, up to about 6 mils, up to about 4 mils, and/or up to about 2 mils. In other embodiments, the shape memory alloy portion of the SMA element may have an average thickness of less than 0.1 mils or more than 20 mils.

The SMA element 216,316 can have any length (e.g. longest dimension). According to some embodiments, the SMA element 216,316 has a length of at least about 0.01 inches, at least about 0.05 inches, at least about 0.1 inches, at least about 0.5 inches, at least about 0.75 inches, at least about 1 inch, at least about 1.5 inches, at least about 2 inches, at least about 3 inches, and/or at least about 5 inches. According to some embodiments, the SMA element has a length of up to about 10 inches, up to about 7.5 inches, up to about 5 inches, up to about 3 inches, up to about 1.5 inches, up to about 1 inch, and/or up to about 0.5 inches. In some embodiments, the SMA element may have a length of less than 0.01 inches or more than 10 inches.

For SMA elements 216,316 that change shape in response to heat, the actuation temperature of the SMA element 216,316 may any temperature suitable for the application and/or environment in which the actuator will be used. According to some embodiments, the actuation temperature of the SMA element 216,316 may be at least about 2° C., at least about 5° C., at least 10° C., at least about 20° C., at least about 40° C., at least about 50° C., at least 60° C., at least 70° C., at least 85° C., and/or at least 100° C. In some embodiments, the SMA element may have an actuation temperature below 2° C.

The SMA element could be formed from a shape memory alloy that comprises nickel (e.g. a copper-zinc-aluminum-nickel alloy, a copper-aluminum-nickel alloy, and/or a nickel-titanium alloy), an alloy that comprises iron (e.g. an iron-platinum alloy, and/or an iron-manganese-gallium alloy), and/or from any other shape memory alloy.

In some embodiments, the SMA element 216,316 may include a core to 430, 530 (FIGS. 4&5) formed from a shape memory alloy and a cladding 420, 520 (FIGS. 4&5) formed from a ferromagnetic material. For example, the SMA element may include a wire (or other element) formed from a shape memory alloy as discussed above (e.g. in the shapes, materials, and sizes discussed above). A ferromagnetic material may then be plated on the shape memory alloy.

The ferromagnetic material may be any ferromagnetic material. For example, the ferromagnetic material may be a material that comprises nickel (e.g. FeNi, Ni, CoNi, NiOFe$_2$O$_3$, etc.), a material that comprises iron (e.g. Fe, FeOFe$_2$O$_3$, NiOFe$_2$O$_3$, MgOFe$_2$O$_3$, Y$_3$Fe$_5$O$_{12}$), and/or may be any other ferromagnetic alloy (MnSb, MnBi, CrO$_2$, MnAs, Gd, Dy, EuO).

In some embodiments, the cladding material comprises up to about 100%, up to about 80%, up to about 50%, up to about 40%, up to about 35%, up to about 30%, up to about 25%, and/or up to about 20% nickel. In some embodiments, the cladding material comprises at least about 5%, at least about 10%, at least about 15%, at least about 20%, at least about 25%, at least about 30%, at least about 50%, at least about 70%, and/or at least about 90% nickel. In other embodiments, the cladding may comprise less than 5% nickel.

In some embodiments, the cladding material comprises up to about 100%, up to about 95%, up to about 90%, up to about 85%, up to about 80%, up to about 75%, up to about 50%, and/or up to about 25% iron. In some embodiments, the cladding material comprises at least about 10%, at least about 30%, at least about 45%, at least about 60%, at least about 70%, at least about 80%, and/or at least about 90% iron. In other embodiments, the cladding may comprise less than 10% iron.

The cladding material is preferably electrically conductive, ductile, and malleable. A ferromagnetic cladding material may also be selected such that its Curie temperature is greater than the actuation temperature of the shape memory alloy of the SMA element 216,316.

The cladding material may also be selected such that it is magnetostrictive and/or magnetoelastic. In some embodiments, the SMA element 216,316 may be configured such that a change in shape of the SMA element 216,316 causes a change (e.g. increase or decrease) in the resistance and/or impedance of the cladding material (e.g. changes its impedance to an AC and/or an RF signal) when the SMA element changes shape.

Some alloys (e.g. 80% Ni, 20% Fe) may not be as advantageous (but may be included in an SMA element) if they are not magnetostrictive. Other alloys (e.g. 33% Ni, 67% Fe) may or may not be as advantageous (but may be included in an SMA element) if their Curie temperature is around the actuation temperature of the SMA element 216,316. Examples of magnetostrictive properties for alloys based on their composition are known. See, e.g. "Ferromagnetism", by Bozorth, published in 1951, the disclosure of which is hereby incorporated by reference. Examples of Curie temperatures for alloys based on their composition are known. See, e.g. See, e.g. "Ferromagnetism", by Bozorth, published in 1951, the disclosure of which is hereby incorporated by reference.

In some embodiments, the cladding may have a thickness of at least about 1%, of at least about 5%, at least about 10%, at least about 15%, at least about 20%, at least about 30%, at least about 50%, at least about 70%, at least about 80%, at least about 90%, at least about 100%, and/or at least about 120% of the thickness of the core (e.g. the shape metal alloy portion of the SMA element 216,316). In some embodiments, the cladding has a thickness of up to about 250%, up to about 200%, up to about 170%, up to about 150%, up to about 140%, up to about 130%, up to about 120%, up to about 115%, up to about 110%, up to about 105%, up to about 95%, up to about 90%, up to about 80%, up to about 70%, up to about 60%, up to about 50%, up to about 40%, up to about 30%, up to about 20%, up to about 15%, and/or up to about 10% of the thickness of the core 430. In some embodiments, the cladding may have a thickness of more than 250% or less than 1% of the thickness of the core.

In some embodiments, the cladding has a thickness of at least about 0.1 mils, at least about 0.2 mils, at least about 0.3 mils, at least about 0.4 mils, at least about 0.5 mils, at least about 0.7 mils, at least about 1 mil, at least about 2 mils, at least about 3 mils, at least about 4 mils, at least about 5 mils, at least about 6 mil, at least about 7 mils, and/or at least about 8 mils. In some embodiments, the cladding 420 has a thickness of up to about 30 mils, up to about 20 mils, up to about 17 mils, up to about 15 mils, up to about 13 mils, up to about 12 mils, up to about 10 mils, up to about 8 mils, up to about 6 mils, up to about 5 mils, up to about 4 mils, up to about 3 mils, up to about 2 mils, up to about 1 mil, up to about 0.7 mils, up to about 0.5 mils, and/or up to about 0.3 mils. In other embodiments, the cladding may have a thickness of less than 0.1 mils or more than 30 mils.

If a signal is supplied to an SMA element 216,316 to actuate the SMA element 216,316, at least a portion of the signal may be supplied such that it primarily travels through a ferromagnetic material (e.g. a ferromagnetic cladding, a ferromagnetic alloy, etc.) for at least a portion of the SMA element 216,316 (i.e. such that a greater amount of that signal portion travels through the ferromagnetic material per volume of the ferromagnetic material than travels through the other portions of the SMA element 216,316 in the highest conducting state of the ferromagnetic material).

In some of these embodiments, the ferromagnetic material and the RF signal may be configured such that the ferromagnetic material serves as a highly restrictive element to the flow of the RF signal (e.g. restricts at least about 25% and/or at least 50% of the RF signal) at some actuation state beyond the initial actuation state (i.e. the first state of the SMA element 216,316 at which the SMA actuator 202 is actuated) of the SMA element 216,316. In this manner, the ferromagnetic material may serve as a control on the amount of current applied to the SMA element when the SMA element is being maintained in the actuation state (e.g. allows the signal to pass through the SMA element 216,316 as the actuator approaches its initial actuation state, restricts the passing of the signal at some point after the initial actuation state which decreases heating of the SMA element 216,316, and then allows current to flow again as the SMA element starts to relax back towards its initial actuation state to heat the SMA element, helping to maintain the SMA element in its actuated state).

Additionally (or alternatively), if a signal is supplied to an SMA element 216,316 to actuate the SMA element 216,316, at least a portion of the signal may be supplied such that it primarily travels through the cladding material (e.g. a ferromagnetic cladding) for at least a portion of the SMA element 216,316 (i.e. such that a greater amount of that signal portion travels through the cladding material per volume of the cladding material than travels through the other portions of the SMA element 216,316 in the highest conducting state of the cladding material).

For example, the cladding material may be applied as the outer conductive surface of the SMA element 216,316, and a signal used to actuate the SMA element 216,316 may comprise an RF signal portion that travels through the exterior conductive portion of the SMA element 216,316 (e.g. primarily through the cladding material). This signal could also include a direct current portion that travels equally through all conductive parts of the SMA element 216,316 and/or primarily through the shape memory alloy portion of the SMA element 216,316.

In some of these embodiments, the cladding material and the RF signal may be configured such that the cladding material serves as a highly restrictive element to the flow of the RF signal (e.g. restricts at least about 25% and/or at least 50% of the RF signal) at some actuation state beyond the initial actuation state (i.e. the first state of the SMA element 216,316 at which the SMA actuator 202 is actuated) of the SMA element 216,316. In this manner, the cladding material may serve as a control on the amount of current applied to the SMA element when the SMA element is being maintained in the actuation state (e.g. allows the signal to pass through the SMA element 216,316 as the actuator approaches its initial actuation state, restricts the passing of the signal at some point after the initial actuation state which decreases heating of the SMA element 216,316, and then allows current to flow again as the SMA element starts to relax back towards its initial actuation state to heat the SMA element, helping to maintain the SMA element in its actuated state).

Referring to FIG. 4, an SMA element 416 includes a shape memory alloy core 430 and a ferromagnetic material cladding 420 that extents over substantially all (e.g. essentially all as illustrated, at least about 60%, at least about 75%, and/or at least about 90%) of the core 430.

In some embodiments, the cladding 420 may have a thickness of at least about 1%, at least about 5%, at least about 10%, at least about 15%, and/or at least about 20% of the thickness of the core 430, or any of the size ranges discussed above. In some embodiments, the cladding 420 has a thickness of up to about 50%, up to about 40%, up to about 30%, up to about 20%, up to about 15%, and/or up to about 10% of the thickness of the core 430, or any of the size ranges discussed above. In other embodiments, the cladding 420 may have a thickness of less than 1% or more than 50% of the thickness of the core 430.

In some embodiments, the cladding 420 has a thickness of at least about 0.1 mils, at least about 0.2 mils, at least about 0.3 mils, at least about 0.4 mils, at least about 0.5 mils, at least about 0.7 mils, at least about 1 mil, at least about 2 mils, and/or at least about 3 mils, or any of the size ranges discussed above. In some embodiments, the cladding 420 has a thickness of up to about 5 mils, up to about 4 mils, up to about 3 mils, up to about 2 mils, up to about 1 mil, up to about 0.7 mils, up to about 0.5 mils, and/or up to about 0.3 mils, or any of the size ranges discussed above. In other embodiments, the cladding 420 may have a thickness of less than 0.1 mils or more than 5 mils.

Referring to FIG. 5, an SMA element 516 includes a ring of ferromagnetic material cladding 520 around a shape memory alloy core 530. The cladding 520 extends over only a limited portion of the core 530. The SMA element 516 may have multiple rings of cladding 520 along its length. For example, the SMA element 516 may have at least two, at least three, and/or at least four rings, at least five, at least eight, and/or at least ten rings of cladding around core 530. In some embodiments, SMA element 516 may have a ring of cladding at least every 0.001 inches, at least every 0.01 inches, and/or at least every 0.1 inches of the SMA element 516.

In some embodiments, one or more rings of cladding 520 may have a length (e.g. extension along the core 530) of at least about 0.001 inches, at least about 0.005 inches, at least about 0.01 inches, at least about 0.03 inches, at least about 0.05 inches, at least about 0.1 inches, at least about 0.2 inches, and/or at least about 0.3 inches. In other embodiments, one or no rings of cladding 520 have a length greater 0.001 inches.

In some embodiments, the cladding 520 may have a thickness of at least about 1%, at least about 10%, at least about 30%, at least about 50%, at least about 70%, at least about 80%, at least about 90%, at least about 100%, and/or at least about 120% of the thickness of the core 530, or any of the size ranges discussed above. In some embodiments, the cladding 520 has a thickness of up to about 250%, up to about 200%, up to about 170%, up to about 150%, up to about 140%, up to about 130%, up to about 120%, up to about 115%, up to about 110%, up to about 105%, up to about 95%, up to about 90%, up to about 80%, up to about 70%, up to about 60%, and/or up to about 50% of the thickness of the core 530, or any of the size ranges discussed above. In other embodiments, the cladding 520 may have a thickness less than 1% or more than 250% of the thickness of the core 530.

In some embodiments, the cladding 520 has a thickness of at least about 0.5 mils, at least about 1 mil, at least about 2 mils, at least about 3 mils, at least about 4 mils, at least about 5 mils, at least about 6 mil, at least about 7 mils, and/or at least about 8 mils, or any of the size ranges discussed above. In some embodiments, the cladding 520 has a thickness of up to about 30 mils, up to about 20 mils, up to about 17 mils, up to about 15 mils, up to about 13 mils, up to about 12 mils, up to about 10 mils, up to about 8 mils, up to about 6 mils, up to about 5 mils, up to about 4 mils, up to about 3 mils, up to about 2 mils, and/or up to about 1 mil, or any of the size ranges discussed above. In some embodiments, the cladding 520 may have a thickness of less than 0.5 mils or more than 30 mils.

In some embodiments, the conductive portion of the SMA element consists essentially of ferromagnetic material.

Referring again to FIGS. 2-5, SMA element 216,316,416, 516 could include insulation (e.g. to retain heat, electrical insulation, etc.) and/or other coverings or coatings. In some embodiments, the cladding 420, 520 may be selected such that it is easier to retain by solder than the shape memory alloy portion 430, 530 of the SMA element 216,316,416,516. In many embodiments, the cladding is located at least at the ends of the SMA element 216,316,416,516.

If the SMA element 216,316,416,516 is cladded, the cladding 420,520 may be added by any number of techniques such as electroplating, vapor deposition, electrodeposition, printing, and/or another plating technique.

Exemplary Switches for SMA Actuator

Referring to FIG. 6A, a first exemplary switch 602 that is actuated by an SMA element 618 includes a housing 610 (e.g. a cup) configured to hold portions of the SMA actuator 604. The housing 610 includes electrical leads 608 for connecting the SMA element 618 to other circuit components (e.g. a monitoring circuit, a power circuit, a control circuit, etc.) (see, e.g. FIGS. 2 and 3).

Figure 6B:
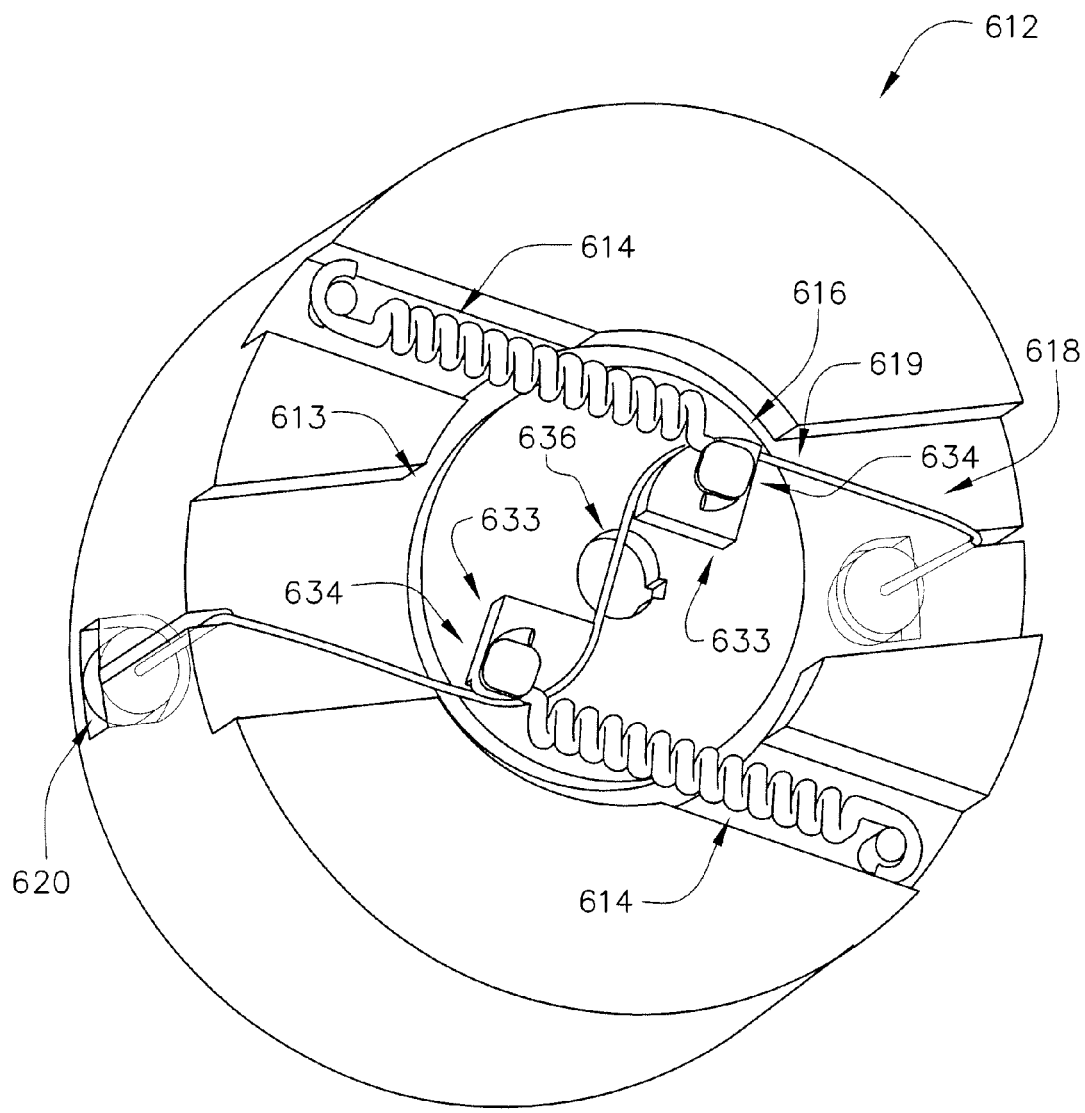

The SMA element 618 is held in place by a body 612. Referring to FIG. 6B, body 612 includes a space 613 adapted to receive a spindle 616. Spindle 616 is held such that it can rotate within space 613. SMA element 618 is placed around body 612 such that barrel crimps 620 extend into spaces in body 612. SMA element 618 is held by body 612 such that SMA element 618 is electrically coupled to leads 608 (FIG. 6A). SMA element 618 is also placed over spindle 616. SMA element 618 is arranged such that bent portion 619 of SMA element 618 is arranged around projections 633 in spindle 616. Projections 633 include links 634 which serve as attachment points for springs 614.

In operation, SMA element 618 is actuated (e.g. may be heated by passing a current through SMA element 618 via leads 608 (FIG. 6A) in housing 610 (FIG. 6A)). When actuated, SMA element 618 may be configured to contract, causing bent portion 619 to straighten (although may not become completely straight). Straightening of bent portion 619 causes bent portion 619 to pull on projections 633 of spindle 616, thereby causing spindle 616 to rotate clockwise against the action of springs 614. See, e.g. FIGS. 7A-7D.

When the SMA element 618 is released from being actuated, springs 614 may act to bring spindle 616 and SMA element 618 back to their rest positions. When released from being actuated, SMA element 618 may exhibit a two-way memory effect such that the rest state (e.g. low temperature state) "memorized" by SMA element 618 (with or without the aid of springs 614) helps to bring SMA element 618 back to its rest state position (the springs 614 bringing spindle 616 back to its rest state position). In some of these embodiments, additional projections could be placed in spindle 616 on the opposite side of SMA element 618 as projections 633 to allow SMA element's 618 transition to its rest state position to also bring spindle 616 back to its rest state position (with or without the aid of springs 614).

Referring back to FIG. 6A, switch 602 also includes a body 622. Body 622 includes a projection 624 that mates with a hole 636 (FIG. 6B) in spindle 616 (although it should be appreciated that body 622 and spindle 616 could be mated by any other means, including by making body 622 integral with spindle 616). Body 622 includes a conductive strip 626.

Referring to FIG. 6C, body 622 is configured to be inserted in an insulative housing 628. Housing 628 carries leads 630 configured to be connected to a circuit (e.g. leads 630 may be a portion of a relay connected to an antenna circuit, connected to an electric motor circuit, etc.). Leads 630 include internal projections 640 that extend around the interior surface of housing 628.

In operation, when spindle 616 is in a rest state, conductive strip 626 of body 622 is away from leads 630. As spindle 616 rotates to become actuated (as described above), spindle 616 also rotates projection 624 causing body 622 to rotate. As body 622 rotates, conductive strip 626 rotates into contact with internal projections 640 of leads 630. Conductive strip 626 becomes in contact with both leads 630, thereby connecting leads 630 to each other (closing the circuit to which leads 630 are connected).

While bent portion 619 (FIG. 6B) is shown as a double curved bend, the bent portion 619 may take any other shape capable of causing rotation including a single curve bend (see FIG. 9)

Referring to FIGS. 7A-D, an SMA element 705 includes a bent portion 710 similar to bent portion 619 (FIG. 6B) of SMA element 618 (FIG. 6B). SMA element 705 has a rest state 720 in which the actuator not actuated, an intermediate unactuated (transition) state 730 in which the actuator is not in its rest state but is not actuated, an initial actuated state 740 at which the actuator is first actuated, and an extended actuated state 750 in which the actuator is actuated at a point beyond the initial actuated state 740.

Figure 8:
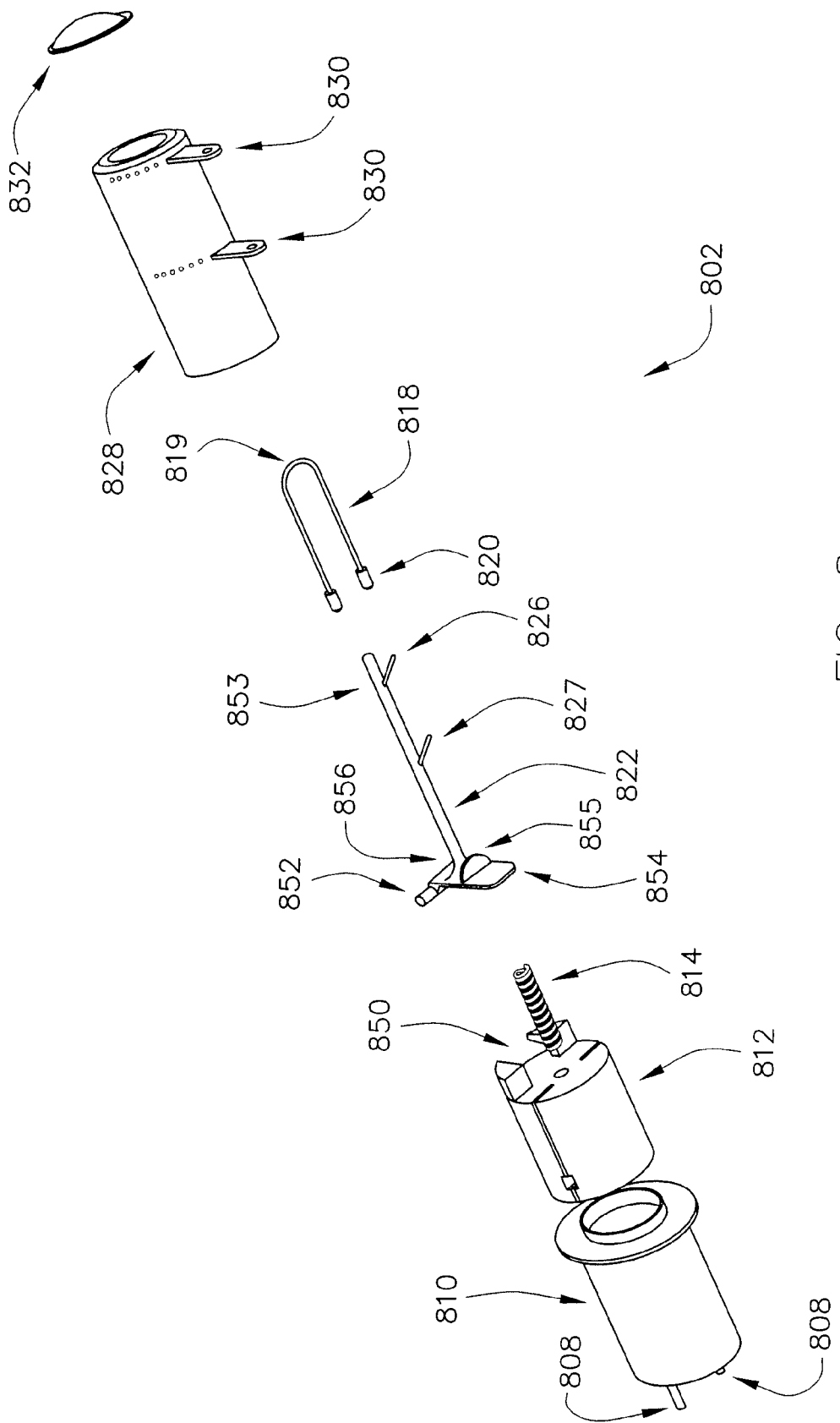
FIG. 8 is an illustration of a switch including an SMA actuator according to one embodiment.

Referring to FIG. 8, a second exemplary switch 802 that is actuated by an SMA element 818 includes a housing 810 (e.g. cup) configured to hold portions of the SMA actuator 804. The housing 810 includes electrical leads 808 for connecting the SMA element 818 to other circuit components (e.g. a monitoring circuit, a power circuit, a control circuit, etc.) (see, e.g. FIGS. 2 and 3).

The SMA element 818 is held in place by a body 812. Body 812 has a connector 850 (e.g. a space surrounded by projections configured to form a snap connection) configured to receive and/or hold a connector 852 of a body 822. Body 822 also includes a lever arm portion 854 and an extension portion 853. Extension portion 853 carries contacts 826,827 which are in electrical communication with each other (e.g. they are part of a single wire, they contact a common conductive material on extension 853, etc.).

In operation, SMA element 818 is connected to body 812 such that bent portion 819 sits snugly over lever arm 854 on a portion of lever arm 854 that is on an interior side 856 of projection 855. As SMA element 818 starts to change shape (e.g. contract), SMA element 818 will pull on lever arm 854 (and/or its projection 855) which will cause lever arm 854 (and thus body 822) to rotate towards body 812 around a pivot formed by connector 852. Spring 814 is positioned to rotate body 822 in the opposite direction as SMA element 818 starts to relax.

Switch 802 also includes housing 828 which includes leads 830 that are connected to a circuit (e.g. an antenna circuit). As body 822 rotates forward, extension 853 rotates contacts 826, 827 forward into contact with an interior portion of leads 830, thereby completing that portion of the circuit to which leads 830 are connected.

SMA element 818 may have a rest state, intermediate states, and actuated states in the same manner as described with respect to SMA element 618, above. In some embodiments, SMA elements 618,818 may be soldered to (and/or a portion connected to) one or more of housing 610,810, body 612,812, and/or leads 608,808.

Referring to FIG. 9, an SMA element 918 is configured to contract when heated. As SMA element 918 contracts, SMA element 918 pulls on projection 980 of spindle 916 causing spindle 916 to rotate around axis 982. Rotation of spindle 982 actuates actuator 904.

Referring to FIGS. 10A and 10B, an SMA actuator 1004 includes an SMA element 1018 that extends through a passage 1082 in a body 1016. Actuation of SMA element 1018 causes SMA element 1018 to expand. Expansion of SMA element 1018 causes body 1016 to move upwards, actuating actuator 1004. Ends 1090 of SMA element 1018 may be fixed to housing 1010, a circuit board (not shown), or some other member.

Any other arrangements may be used. According to some embodiments, the actuator 604, 804, 904, 1004 may be powered to maintain an unactuated state and power may be removed to go to the actuated state. According to some embodiments, SMA element 618, 818,918,1018 may be maintained in an intermediate position whereby application of power to the SMA element may cause the actuator to actuate a first system, while removal of the maintenance power may cause the actuator to actuate a second system. Moreover, any number of other systems may be actuated by a single actuator where the actuator can be maintained in a number of different states.

Exemplary System Incorporating SMA Actuator

Referring again to FIG. 1, SMA actuator 202 may be used to actuate a switch 220 such as a relay. The switch/relay 220 may be configured to control a system 218. the system could be any type of system, such as a vehicle system (e.g. a land vehicle system, an air vehicle system, a water vehicle system, etc.). In one embodiment, system 218 comprises an antenna system for an airplane, such that SMA actuator 202 is configured to actuate a relay 220 that controls a circuit of antenna 218.

SMA actuator 202 may be designed to operate in various conditions in which systems 218 are mounted. For example, SMA actuator 202 may be configured to operate in ambient temperatures up to about 125° C. (or higher) and/or may be configured to operate in temperatures as low as −55° C. (or lower). SMA actuator 202 may be configured to operate in environments having high vibration such as environments where random, sinusoidal, or other vibration may occur up to or greater than 30 G's RMS or where high impulse type impacts or shock of lower, similar, or greater force than 30 G's may occur.

SMA actuator 202 may also be configured to operate in environments having high vibration such as environments of shock (e.g. 75 G shock pulse and as is found in military specification MIL-STD-202) and/or random vibration (e.g. 7.94 GRMS curve E as found in Radio Technical Commission for Aeronautics (RTCA) document DO-160E).

EXAMPLES

The following examples are provide by way of example only, and are not intended to limit the invention of this patent, unless all of the features of an example are specifically incorporated in a claim, below.

Example 1

An SMA element includes a shape memory alloy core and a ferromagnetic cladding. The shape memory alloy core is a rod formed from a Nitinol (NiTi) alloy. The core has a diameter of about 0.004 inches and a length of about 2 inches. The cladding is formed over the core from a Ni plating. The cladding extends over essentially the entire core and has a thickness above the core of about 0.0005 inches such that the total diameter for the SMA element is about 0.005 inches.

Example 2

An SMA element includes a shape memory alloy core and a ferromagnetic cladding. The shape memory alloy core is a rod formed from a Nitinol alloy. The core has a diameter of about 0.008 inches and a length of about 2 inches. The cladding is formed over the core from a Ni alloy. The cladding extends over essentially the entire core and has a thickness above the core of about 0.001 inches such that the total diameter for the SMA element is about 0.01 inches.

Example 3

An SMA element includes a shape memory alloy core and a ferromagnetic cladding. The shape memory alloy core is a rod formed from a Nitinol alloy. The core has a diameter of about 0.01 inches and a length of about 2 inches. The cladding is formed over the core from a Nickel plating. The cladding extends over essentially the entire core and has a thickness above the core of about 100 microinches.

Example 4

An SMA element includes a shape memory alloy core and a ferromagnetic cladding. The shape memory alloy core is a foil formed from a Nitinol alloy. The core has a thickness of about 0.004 inches, a width of about 0.02 inches, and a length of about 2 inches. The cladding is formed over the core from Ni. The cladding extends over essentially the entire core and has a thickness above the core of about 0.0005 inches such that the total thickness for the SMA element is about 0.005 inches.

Example 5

An SMA element includes a shape memory alloy core and a ferromagnetic cladding. The shape memory alloy core is a foil formed from a Nitinol (NiTi) alloy. The foil has a thickness of about 0.003 inch, a width of about 0.2 inch, and a length of about 2 inches. The cladding is formed over the core from a Nickel plating. The core extends over essentially the entire core and has a thickness above the core of about 500 microinches.

Example 6

An SMA element consists essentially of a shape memory alloy. The shape memory alloy is a rod formed from a NiTi alloy. The SMA element has a diameter of about 0.002 inches and a length of about 2 inches.

Example 7

An SMA element consists essentially of a shape memory alloy. The shape memory alloy is a rod formed from a NiTi alloy. The SMA element has a diameter of about 0.004 inches and a length of about 2 inches.

Example 8

An SMA element consists essentially of a shape memory alloy. The shape memory alloy is a rod formed from a NiTi alloy. The SMA element has a diameter of about 0.01 inches and a length of about 3 inches.

Example 9

An SMA actuator is constructed as shown and described above in FIG. 8. The SMA actuator includes an SMA element as described above in Example 7.

At about room temperature, a DC power signal of about 1.25 volts and 0.17 amps is provided to the SMA element. The DC signal heats the SMA element but does not cause the SMA element to change shape. A second DC power signal of about 0.7 volts and 0.01 amps is provided to the SMA element to actuate the SMA element. The SMA element is actuated in about 50 ms from sending the second DC signal, and can be actuated for at least 100,000 cycles.

Example 10

An SMA actuator is constructed as discussed above in Example 10, and further includes a current shunt to monitor current (and, indirectly, resistance of the SMA element) in the SMA element circuit. The current of the first signal is adjusted based on the resistance measured in the SMA element circuit.

Example 11

An SMA actuator is constructed as discussed above in Example 10, and further includes an oscillator circuit configured to provide an RF signal to the SMA element. The actuator also includes an OpAmp in series with the SMA element to measure impedance in the SMA element circuit. The first DC signal is adjusted based on the amount of impedance measured in the SMA element circuit.

Example 12

An SMA actuator is constructed as discussed above in Example 10. The actuator additionally includes tick marks spaced at 1° intervals along the perimeter of the rotating body of the actuator. An optical sensor is positioned to identify tick marks crossing the sensor and provide an output to a control circuit. The control circuit is configured to count the tick marks to keep track of the degree of rotation of the rotating body. The control circuit is further configured to control the extent of the first DC signal based on the degree of rotation of the rotating body.

Example 13

An SMA actuator is constructed as shown and described above in FIGS. 6A-C. The SMA actuator includes an SMA element as described above in Example 7.

At about room temperature, a DC power signal of about 1.25 volts and 0.17 amps is provided to the SMA element along with a 0.2 volt, 0.01 amp RF signal modulated at a frequency of about 10 MHz. The DC and RF signals heat the SMA element but do not cause the SMA actuator to actuate.

An RF Detector is provided in series with the SMA element to measure the impedance of the SMA element to the RF signal. The DC signal is adjusted based on the measured impedance.

A second RF power signal of about 5 volts and 2 amps is provided to the SMA element to actuate the SMA element (e.g. the first RF signal is increased). The SMA element is actuated in about 2-5 ms from sending the second RF signal, and can be actuated for at least 100,000 cycles.

Example 14

An SMA actuator is constructed as disclosed in Example 14. The SMA actuator is further configured to adjust the second RF power signal based on the measured impedance.

Example 15

An SMA actuator is constructed as described above in Example 14. The SMA actuator is able to operate between at least the temperatures of −55° C. and 125° C. The SMA actuator can also withstand the effects of vibration of the environment in which it is located (e.g. can withstand 30 G's RMS). The SMA actuator can also withstand other environmental effects such as high impulse type impacts or shock of lower, similar, or greater force than 30 G's that may occur.

Example 16

A relay is constructed from an SMA element as described above in Examples 10 and 12. The relay is mounted in an airplane and is used to perform impedance matching and tuning functions of the RF communication and antenna system for optimum signal transfer.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. In this application, the term real-time refers to performance of an activity in real time, pseudo real time, or actively in time for performance of an activity. Furthermore, other substitutions, modifications, changes, and omissions may be made in the design, operating conditions, and arrangement of the exemplary embodiments without departing from the scope of the invention as expressed in the appended claims.

What is claimed is:

1. A shape memory element comprising:
   a first material in a core of the shape memory element; and
   a second material closer to a surface of the shape memory element than the first material, wherein the second material is a ferromagnetic material;
   wherein the first material comprises a shape memory alloy, and the second material is present along at least about 70% of a surface of the shape memory alloy.

2. The shape memory element of claim 1, wherein the second material has a thickness of up to about 30% of the thickness of the first material.

3. The shape memory element of claim 1, wherein the second material is formed in at least one discrete portion.

4. The shape memory element of claim 3, wherein the second material has a thickness of at least about 80% of the thickness of the first material.

5. The shape memory element of claim 4, wherein the second material has a thickness of up to about 150% of the thickness of the first material.

6. The shape memory element of claim 1, wherein the second material comprises at least one of nickel, iron, and cobalt.

7. The shape memory element of claim 1, wherein the second material has a thickness of at least about 5% of the thickness of the first material.

8. A shape memory element comprising:
   a first material comprising a shape memory alloy, the first material being electrically conductive and disposed in a central core region of the shape memory element; and
   a second material, the second material being an electrically conductive, magnetostrictive, ferromagnetic material disposed circumferentially around the central core region of the shape memory element;
   wherein the second material is located closer to a surface of the shape memory element than the first material.

9. The shape memory element of claim 8, wherein the second material comprises at least one of Cobalt, Nickel, and Iron.

10. The shape memory element of claim 8, wherein the second material consists essentially of Nickel and Iron.

11. The shape memory element of claim 8, wherein the first material forms a core of the shape memory element and the second material forms a cladding over the core.

12. An actuator comprising:
    a shape memory element, the shape memory element comprising,
       a first material in a core of the shape memory element, wherein the first material comprises a shape memory alloy; and
       a second material closer to a surface of the shape memory element than the first material, wherein the second material is a ferromagnetic material, wherein the second material is present along at least about 70% of a surface of the shape memory alloy;
    a switch configured to be actuated by the shape memory element, wherein the switch is configured to complete an electrical circuit.

13. The actuator of claim 12, further comprising a power source configured to provide a radio frequency signal to actuate the shape memory element.

14. The actuator of claim 13, wherein a power source is further configured to provide a direct current signal to the shape memory element.

15. The actuator of claim 13, further comprising a monitoring circuit configured to monitor an impedance of the shape memory element to an alternating current signal, and a control circuit configured to control a signal applied to the shape memory element based on the impedance monitored by the monitoring circuit.

16. The actuator of claim 12, wherein the shape memory element is in a shape of a wire.

17. An actuator comprising:
    a shape memory element, the shape memory element comprising:
       a first material comprising a shape memory alloy, the first material being electrically conductive and disposed in a central core region of the shape memory element; and
       a second material, the second material being an electrically conductive, at least partially magnetostrictive, ferromagnetic material disposed circumferentially around the central core region of the shape memory element;
       wherein the second material is located closer to a surface of the shape memory element than the first material; and
    a switch configured to be actuated by the shape memory element, wherein the switch is configured to complete an electrical circuit.

18. The actuator of claim 17, further comprising a power source configured to provide a radio frequency signal to actuate the shape memory element.

19. The actuator of claim 18, wherein a direct current signal is provided to the shape memory element.

20. The actuator of claim 18, further comprising a monitoring circuit configured to monitor an impedance of the shape memory element to an alternating current signal, and a control circuit configured to control a signal applied to the shape memory element based on the impedance monitored by the monitoring circuit.

21. The actuator of claim 17, wherein the shape memory element is in a shape of a wire.

22. The actuator of claim 12, wherein the second material is configured to allow a signal to pass through the shape memory element as the actuator approaches its initial actuation state, to restrict the passing of the signal at some point after the initial actuation state which decreases heating of the shape memory element, and then to allow current to flow again as the shape memory element starts to relax back towards its initial actuation state to heat the shape memory element.

23. The actuator of claim 17, wherein the switch is configured to control a circuit coupled to an antenna.

* * * * *